United States Patent [19]

Prunier et al.

[11] 4,212,514
[45] Jul. 15, 1980

[54] CONNECTORS FOR OPTICAL CONDUCTORS UTILIZING ELASTOMERIC PADS

[75] Inventors: Jean-Claude Prunier, Herblay; Yves Bellemon, Le Pecq, both of France

[73] Assignee: Societe Nouvelle de Connexion, Boulogne-Billancourt, France

[21] Appl. No.: 882,995

[22] Filed: Mar. 3, 1978

[30] Foreign Application Priority Data

Mar. 28, 1977 [FR] France .................. 77 09119

[51] Int. Cl.$^2$ .................................... G02B 5/14
[52] U.S. Cl. .......................... 350/96.21; 350/96.15
[58] Field of Search ............. 350/96.15, 96.16, 96.20, 350/96.21, 96.22

[56] References Cited

U.S. PATENT DOCUMENTS

| | | | |
|---|---|---|---|
| 3,455,625 | 7/1969 | Brumley et al. | 350/96.22 |
| 3,936,142 | 2/1976 | Kersten | 350/96.21 X |
| 3,948,582 | 4/1976 | Martin | 350/96.21 |
| 3,963,323 | 6/1976 | Arnold | 350/96.22 |
| 3,984,174 | 10/1976 | Landgreen | 350/96.22 |
| 4,008,948 | 2/1977 | Dalgleish et al. | 350/96.21 |
| 4,107,242 | 8/1978 | Runge | 350/96.20 X |

FOREIGN PATENT DOCUMENTS

| | | | |
|---|---|---|---|
| 2556693 | 7/1976 | Fed. Rep. of Germany | 350/96.15 |
| 2456555 | 8/1976 | Fed. Rep. of Germany | 350/96.21 |

OTHER PUBLICATIONS

Jeunhomme et al., "Directional Coupler for Multimode Optical Fibers", Appl. Phys. Lttrs., vol. 29, No. 8, Oct. 15, 1976, pp. 485-487.

Primary Examiner—John K. Corbin
Assistant Examiner—John D. Lee
Attorney, Agent, or Firm—J. Harold Nissen

[57] ABSTRACT

A connector for optical conductors including two bodies provided with a complimentary fixing device for urging them together under axial pressure and a coupling member to receive the ends of the tubular members. Each body carries a tubular member which is adapted to receive and to have fixed therein an end of one of the optical conductors to be connected. The coupling member includes a transparent elastomeric pad having a refractive index close to or substantially the same as that of the optical conductors which are to be connected and brought into engagement under the action of the complimentary fixing device, and the coupling member and/or the elastomeric pad is so shaped as to define between them a space traversed by a portion of the pad and into which the pad can deform under the axial contact pressure exerted thereon by the tubular members. The pad has a generally cylindrical shape in its rest position and passes through the sleeve into the space into which it may deform whereby the axial contact pressure exerted on the pad by the tubular members is insufficiently significant to introduce into the pad constraints giving rise to deterioration in the transmission of light.

12 Claims, 12 Drawing Figures

CONNECTORS FOR OPTICAL CONDUCTORS UTILIZING ELASTOMERIC PADS

The present invention relates to connectors for optical conductors, and more particularly concerns a connector with an elastomeric interfacial pad for optical conductors, more especially of the multifilament type.

By optical conductors of the monofilament type are meant all optical conductors of which the light conduit as such consists of a single fibre, which may be of glass, silica or plastic material, while a multifilament conductor comprises a plurality of fibres assembled in a bundle. The device according to the present invention is applicable to optical conductors of both the specified types.

It is well known that a connection between two optical conductors must fulfil rigorous conditions if it is desired that the connection should not introduce substantial light loss in the junction. These conditions are of two kinds. They concern on the one hand the aspect of the surface of the ends of the conductors to be connected. For a good joint of two cylindrical conductors, this surface should be both as perfectly polished as possible, and be perpendicular to the generatrix of the cylinder.

On the other hand these conditions concern the geometrical relative positions of the two ends to be connected: the ends of the optical conductors to be joined must, as far as possible, touch one another and constantly exert a contact pressure between them in order to promote this contact, and the angular alignment and the alignment of the axes of the conductors should be precise in the region of the transition from one conductor to the other. In the case of a junction of two monofilaments, these two latter conditions should be about 1 degree and about 2 or 3 microns, respectively.

These conditions can only be expressly fulfilled by means of expensive connectors, requiring a long and complicated setting up operation, constructed in the form of precision mechanical devices of which the tolerances of manufacture and assembly are very small. There already exist connectors which are simpler to construct and assemble, as well as to set up, using a junction element interposed between the ends of the optical conductors to be connected, and formed of a transparent material having a refractive index very close to that of the optical conductors, in order to guide the light along the length of this element from the emitting optical conductor to the receiving optical conductor. In the case where this junction element is used to connect two bundles, it serves the same purpose for the mixture of different modes guided in each of the optical fibres comprising the bundles.

For this purpose it is known to use either rigid bars formed of a material such as glass or silica, or pads or couplings in a material exhibiting a certain compliance such as the elastomers, for example of silicone, enclosed in a casing, and upon which the ends of the conductors to be connected are applied with a certain contact pressure, which introduces into the interfacial element and into the extremities of the optical conductors, constraints which are the origin of deteriorations in the transmission of the light.

In elastomeric elements, these constraints give rise to a phenomenon of double refraction particularly detrimental to the transmission of polarized light.

The object of the present invention is to provide a connector with an interfacial element for optical conductors which presents the same advantages as those already known as regards the ease of construction and setting up during connection and in disconnection, without introducing substantial deterioration in the transmission of the light, even when polarized.

The present invention provides a connector for optical conductors, comprising two opposite bodies provided with complimentary fixing means whereby they may be urged together under axial pressure, each body carrying a tubular member adapted to receive and to have fixed therein an end of one of the optical conductors to be connected, and a coupling member arranged to receive the ends of said tubular members and having located therein a transparent elastomeric pad having a refractive index close to or substantially the same as that of the optical conductors to be connected and into engagement with which the said tubular members can be brought under the action of said complimentary fixing means, the said coupling member and/or the said elastomeric pad being so shaped as to define between them a space traversed by a portion of said pad and into which the said pad can deform under the axial contact pressure exerted thereon by said tubular members.

Preferably each said tubular member comprises a barrel portion having at its end a central bore adapted to receive therein an optical conductor fixed in such a manner that the end of the optical conductor is located in the same plane as the end of the barrel portion, and the said coupling member comprises a sleeve so located in one of the said bodies that the said pad is constantly in contact with the barrel portion of the tubular member carried by the same body, and that the barrel portion of the other tubular member is capable of penetrating the sleeve by sliding into the latter.

A first embodiment of this latter construction comprises a pad of cylindrical form retained by its end in the central bore of the sleeve, which comprises an annular internal groove crossed by the central part of the pad and constituting the space into which the pad is capable of deformation.

In a second embodiment the sleeve is crimped at one of its ends onto the barrel of the tubular member carried by the body in which it is received, the pad consisting of two cylindrical end portions slidingly mounted in the sleeve and joined with a cylindrical central portion of smaller diameter by two frustoconical components, and being retained within the sleeve by an annular abutment projecting to the interior of the latter between the end portions of the pad.

In a third embodiment the sleeve is crimped by one of its ends, onto the barrel of the tubular member carried by the body in which it is received, and the pad consists of two adjacent cylindrical portions of different diameter, the portion of smaller diameter being slidingly mounted in the central bore of the sleeve, and the portion of greater diameter being in contact with the barrel of the tubular member on which the sleeve is crimped, in a counter-bore of the sleeve constituting the space into which the pad is capable of being deformed.

According to a fourth embodiment, intended to ensure a multimode transmission, with optional extraction of modes between an emitting optical conductor and a receiving optical conductor, the said sleeve is located within the body carrying the tubular member in which is to be fixed the receiving optical conductor; the said pad comprises a core surrounded by a sheath, has a cylindrical portion so held in a central bore of the said coupling member that it can be retained in contact with the said tubular member which is to contain the receiving optical conductor and that it is located adjacent a supplementary optical receiver, and has a portion with a plurality of peripheral grooves, or a helical peripheral groove, and located within the said space; and the arrangement is such that with the said pad located between said tubular members under axial contact pressure light can be conducted between emitting and receiving optical conductors held in the respective tubular members, whereas upon application of a greater axial contact pressure, for said extraction of modes, the said grooved portion of the pad undergoes deformation such that the core of the pad adopts a sinusoidal configuration causing deflection of light to said supplementary optical receiver.

According to the invention, the pad may equally well not be a single piece element, and, in this case, it is advantageous that it is formed in two symmetrical pieces each of which is located in a bore of one of the said tubular members in which is to be fixed the corresponding optical conductor, the arrangement being such that when the two tubular members are caused to approach one another under the action of said complimentary fixing means, the facing surfaces of the said pad pieces come together and adhere to one another to form the composite, deformable pad.

The invention is illustrated by way of example in the accompanying drawings, in which.

Figure 1:
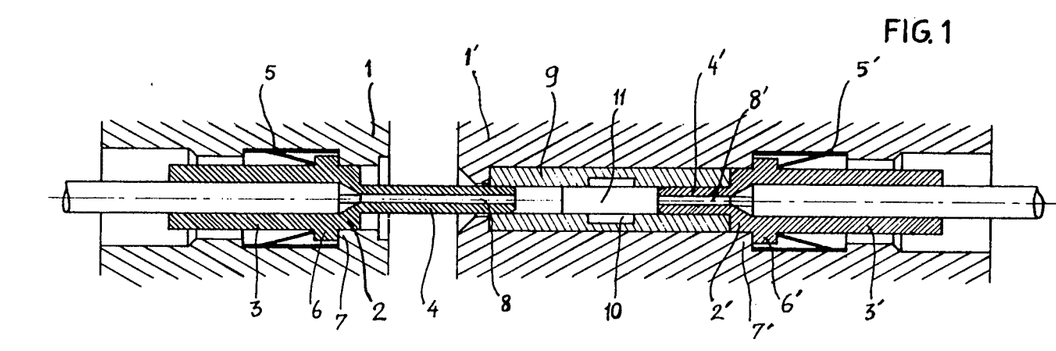
FIGS. 1 and 2 show a first connector, respectively before and after the connection is effected.
Figure 2:
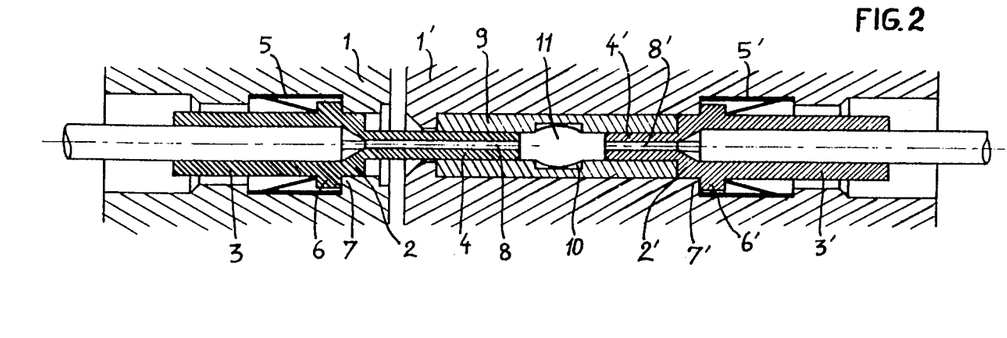

Referring to FIGS. 1 and 2, a connector according to the invention comprises a casing formed by two opposing bodies 1 and 1', which can be brought together with one another by any conventional known means not shown, for example by screwing, this means providing for an axial pressure of one of the bodies 1 and 1' against the other.

Each of the bodies 1 and 1' receives a tubular member 2, 2' comprising a shoulder 3, 3', and a barrel 4, 4'. Each tubular member 2, 2', is retained in the corresponding body 1, 1', by means of a resilient member 5, 5', which assures simultaneous axial and radial positioning of the shoulder 3, 3' by bearing against a flange 6, 6' of the shoulder 3, 3', which abuts against an internal shoulder 7, 7' on the body 1, 1'. The tubular members 2, 2', each receive the end of one of two optical conductors 8, 8', to be connected, these conductors 8, 8' having, previously to the positioning of the tubular members 2, 2', in the bodies 1, 1', been introduced through the shoulders 3, 3', until they pass the central bore arranged in each of the barrels 4, 4', then fixed in the tubular members 2, 2', cut at the level of the end of the barrels 4, 4', and finally carefully polished in such a manner that their extremities are coplanar with those of the barrels 4, 4'.

The tubular member 2 is mounted in such a manner that its barrel 4 projects from the body 1, and extends towards the barrel 4' of the tubular member 2', penetrating into the central bore of a sleeve 9, located in the body 1'. An annular internal groove of the sleeve 9 issuing from the main bore of the latter forms a space 10, crossed by the central part of a pad 11 of a transparent silicone elastomer, of which the refractive index is close to that of the optical conductors, the pad 11 being received by its ends in the central bore of the sleeve 9, and the barrel 4' lightly compressing the pad 11. When the bodies 1 and 1' are coupled (see FIG. 2), the barrel 4 is driven to slidingly penetrate into the bore of the sleeve 9 until it compresses the pad 11 which can deform into the space 10 which serves the purpose of an expansion chamber. The deformation of the pad 11 under the pressure of the barrels 4 and 4' assures a transmission of light through the coupled assembly in a medium substantially identical to that of the conductors, of which the contact with the pad is maintained, whatever the relative play of the barrel 4 in the longitudinal direction before the coupling operation, under a sufficient pressure, this pressure being not sufficiently significant to introduce into the pad and likewise into the conductors, constraints giving rise to deterioration in the transmission of light.

Figure 3:
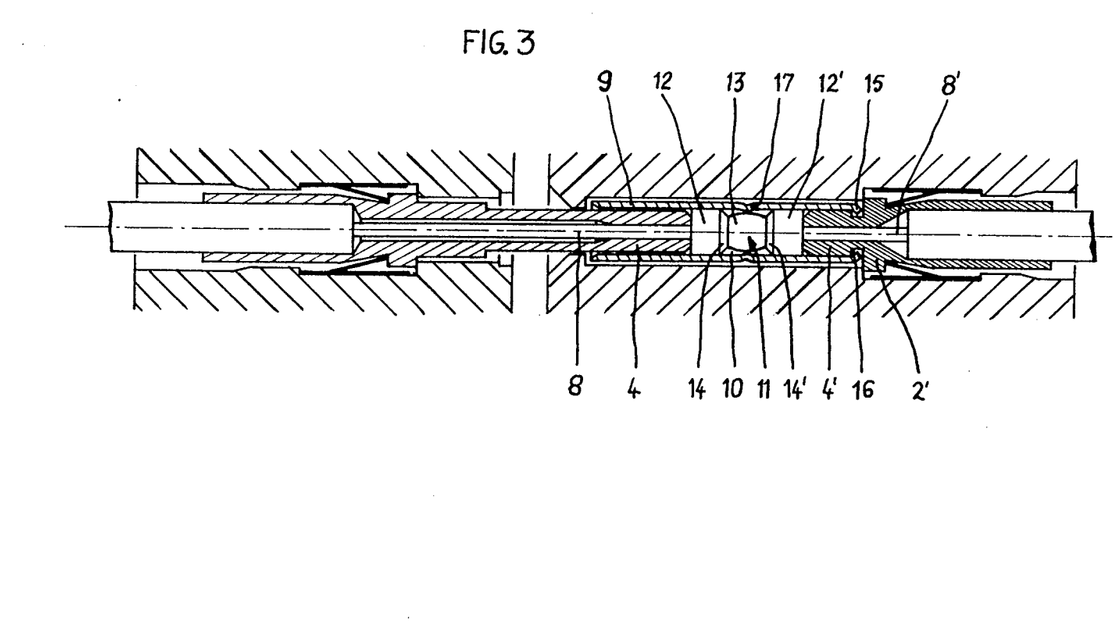
FIGS. 3 and 4 show respectively a second and third connector according to the invention after the connection is established.

The essential difference between the connectors shown in FIG. 3 and that previously described is in the pad 11 which, in this second embodiment, is a single piece pad formed of two end portions 12 and 12', of cylindrical shape, joined via two frustoconical components 14 and 14' with a central portion 13, of a shape which, when relaxed, is cylindrical or slightly barrel-shaped. The pad 11 is slidingly mounted by its end portions 12, 12', in the sleeve 9, which is in the form of a tube fixed to the tubular member 2' by its end 15 which is crimped into the groove 16 arranged at the root of the barrel 4'. The pad 11 is retained in the sleeve 9 by an annular abutment 17 projecting into the interior of the latter, between the end portions 12, 12' of the pad 11.

The expansion chamber or space 10, into which the pad 11 is capable of deforming at its central portion 13, which then takes a distinctly barrelled-shape, is in this case formed by the space bounded between the sleeve 9 and the end portions 12, 12'.

Figure 4:
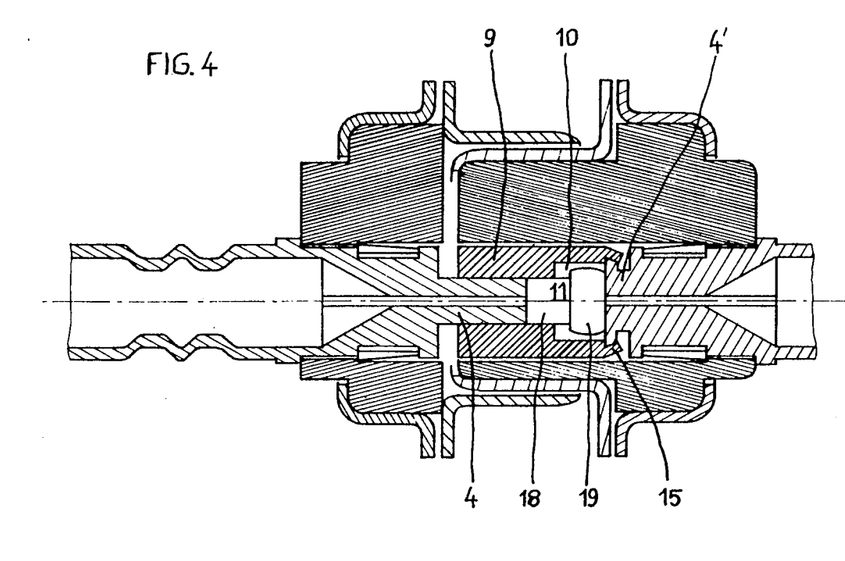

In a third embodiment, shown in FIG. 4, the one-piece pad 11 comprises two adjacent cylindrical portions 18 and 19, of different diameters, the portion 18 of smaller diameter being slidingly mounted in the central bore of the sleeve 9, and the portion 19 of greater diameter being disposed in a counter-bore of the sleeve 9 defining the space 10 (or the expansion chamber), into which the pad 11 deforms at its portion 19, which takes a barrelled-shape, when the pad 11 is urged against the barrel 4', upon which the end 15 of the sleeve 9 is crimped, under the pressure of the barrel 4, driven to penetrate into the central bore of the sleeve 9 under the action of the means which promote axial pressure of the bodies 1 and 1' against one another.

The invention also relates to connectors with an elastomeric pad capable of deforming into an expansion chamber, which provides for a multimode transmission, and allows the extraction of modes as necessary. Such has been described in the article of Jeunhomme and Pocholle, appearing in the periodical "Applied Physics Letters", vol. 29 no. 8 of 15 Oct. 1976: "With the recent development of multimode low loss optical conductors, interest has focussed on the realisation of connectors capable of deflecting a part of the light conducted in an optical conductor towards another conductor or towards a photodetector. It is well known that the propagation constants $\beta$ of the guided modes of a multi-mode optical conductor, consisting of a core of refractive index n1, surrounded by a sheath of refractive index n2, satisfy the double irregularity $(2\pi/\lambda)$ n2 $< \beta < (2\pi/\lambda)$ n1, where $\lambda$ is the wavelength of propagation of the mode concerned in vacuum, and all the modes for which $\beta \leq (2\pi/\lambda)$ n2 are emitted or lost, with the consequence that, in the two cases, a significant part of the energy which they transport can cross the sheath to reach a surrounding receptor of greater refractive index. It has likewise been demonstrated that a periodic deformation of the axis of the optical conductor causes a transmission of power between guided modes having the propagation constants $\beta$ and $\beta'$ such that $\beta - \beta' = \pm 2\pi/d$, where d is the wavelength of the mechanical deformation".

Figure 5:
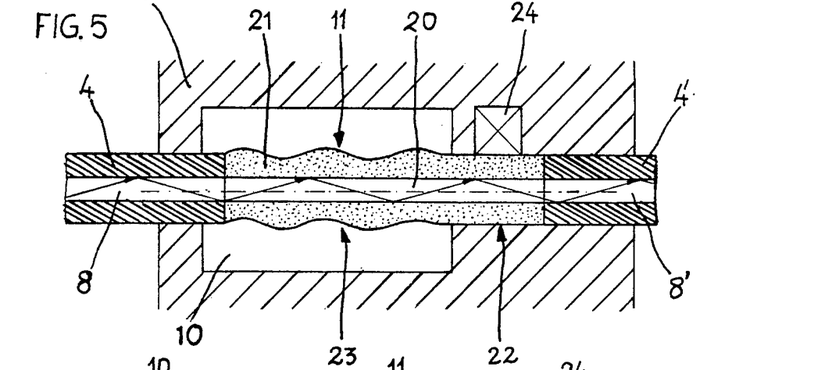
FIGS. 5 and 6 show, in diagrammatic form, the working part of a fourth connector, permitting the extraction of modes, respectively before and during the deflection of a part of the transmitted light is effected.
Figure 6:
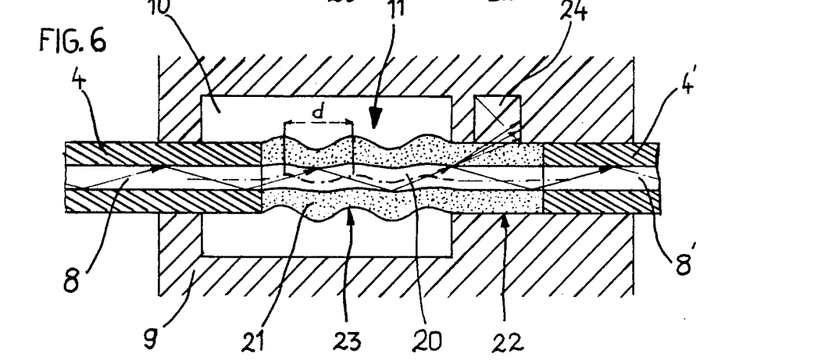

The connector according to the present invention, of which the working parts are shown in FIGS. 5 and 6, applies these principles to permit a connection between the guided modes and the emitted modes. For this purpose, the pad 11 is formed with a core 20, of refractive index n1 close to that of the emitting optical conductor 8 and the receiving optical conductor 8', carried by the barrels 4 and 4', surrounded by a sheath 21 of index n2, lower than n1. The pad 11 is retained by its cylindrical end 22 in the central bore of the sleeve 9 and is constantly in contact, via this end 22, with the receiving optical conductor 8'. The other part 23 of the pad 11 crosses an internal space 10 of the sleeve 9, and is of such a configuration that the external generatrix of the sheath 21 exhibits a certain number of grooves or a helical groove, while the core 20 is not substantially deformed when relaxed or under the light pressure exerted by the barrel 4, when a transmission between the conductors 8 and 8' is desired without deflection, as is indicated by the arrows indicating the trajectory of light in FIG. 5.

When it is desired to deflect a part of the light crossing the pad 11 towards the supplementary optical receptor 24, which can be either a photo detector or another optical conductor, adjacent to the cylindrical part 22 of the pad 11, it is sufficient, during the time when this deflection is desired, to exert upon the part 23 of the pad 11 a continual pressure, obtained by an axial displacement of the barrel 4 toward the barrel 4', such that there is caused a sinusoidal deformation of wavelength "d" of the core 20 of the pad 11 and, consequentially, the extraction of certain modes received by the receptor 24 (see FIG. 6).

The invention is also applicable to connectors with elastomeric pads in more than one piece.

Figures 7, 8:
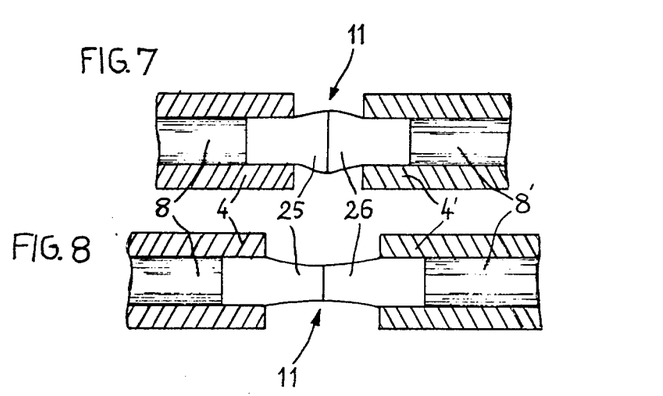
FIGS. 7 and 8 show the possible deformations of a pad comprising two symmetrical parts, joined together by adhesion, this pad being capable of use in another connector according to the invention.

FIGS. 7 and 8 show a pad 11 consisting of two symmetrical pieces 25 and 26, each being retained in the central bore of one of the barrels 4, 4' and being in contact with the end of one of the conductors 8, 8'. The pieces 25 and 26 are placed in contact with one another by axial approach of the barrels 4 and 4' towards one another, as a result of which air has been excluded from between the front faces of the two half-pads, to such an extent that the latter exhibit a relatively substantial adhesion to one another. This suction phenomenon allows a relative displacement of one barrel in relation to the other in all directions in space without the optical transmission being disturbed. Advantageously however, the barrels 4 and 4', and thus the half-pads 25, 26, will be axially guided in a sleeve carried by one of the bodies of the casing. FIGS. 7 and 8 show a relative longitudinal displacement of the barrels 4, 4', respectively with compression and with stretching of the pad 11, without breakage of the connection.

Figure 9:
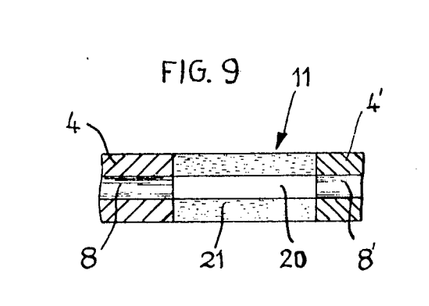
FIGS. 9 to 12 show four preferred possible embodiments of a pad, corresponding elements being identified in the different figures by the same reference indices.

Transparent elastomeric pads can be formed according to different configurations and FIGS. 9 to 12 show four cases of preferred configurations of interfacial pad, which have been chosen with a cylindrical form with the object of simplification. FIG. 9 shows a pad 11 comprising a core 20 of a transparent elastomer surrounded by a hollow cylinder or sheath 21, of which the base material is the same elastomer, into which has been added, before polymerization, a metallic dose, for example of silver or aluminium.

The sheath 21 then acts as an external mirror on the core 20 and ensures the transmission of light within the core 20 without loss towards the exterior.

Figure 10:
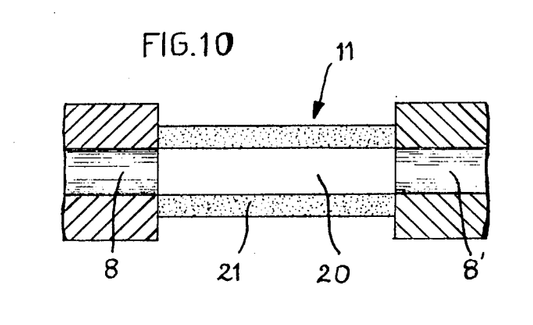

FIG. 10 shows a pad 11 utilising, for the transmission of light, the so-called principle of "jumping index". The core 20 is formed by a transparent elastomer of refractive index close to that of the conductors 8 and 8', and is surrounded by a sheath 21 consisting of the same initial material of which the refractive index has been rendered smaller by the addition of a suitable solvent before polymerization of the elastomer. This solvent may, for example, be cyclohexane. The transmission of light in the pad is ensured by a succession of total internal reflections at the interface between the core 20 and the sheath 21.

Figure 11:
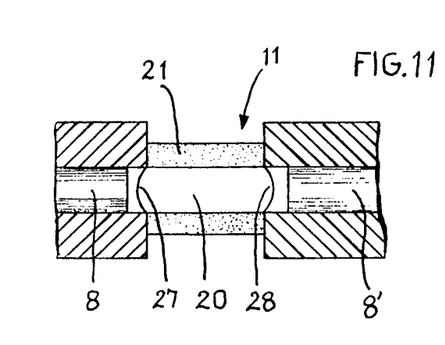

FIG. 11 shows a pad 11 using the same principle of "jumping index", and of which the deformation upon coupling is exploited in order to give it an optical form appropriate for focussing the light into an angle of divergence numerically smaller than that of the cone of acceptance of the receiving conductor. For this purpose, the core 20 is provided with lenticularly shaped ends 27, 28, facing the optical conductors 8 and 8'. This pad enables a more significant radial play upon the coupling, as a result of which the mechanical tolerances in this direction are increased.

Figure 12:
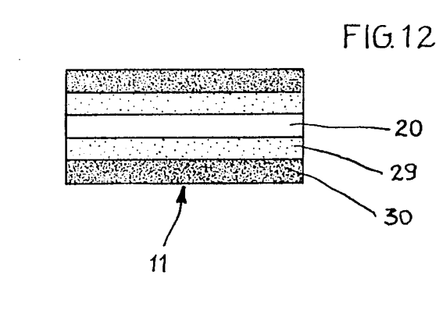

FIG. 12 shows a pad 11 using, for the transmission of light, the so-called principle of "graduated index". It comprises a core 20, in a transparent elastomer of index close to that of the optical conductors, surrounded with concentric layers 29, 30, formed of the same material of which the refractive indices decrease at each layer as they become more distant from the core 20. The layers are formed by tubes of which the refractive index has been reduced by the increasing additions of solvent. The light is transmitted with successive changes of angle, which give a sinusoidal shape to the path of the light rays.

It should be noted that the elastomers having metallic doping or different refractive indices, when they are associated in the body of a single pad, have an identical or very close harness, so that the deformations are very uniformly distributed when the pad is compressed.

Without limitation of the invention, the elastomers used for the construction of such pads can be silicone elastomers well known for their properties of compliance and transparency to light, and of which the refractive index is between 1.45 and 1.5.

What we claim is:

1. A connector for optical conductors, comprising: two opposite bodies provided with complimentary fixing means whereby they may be urged together under axial pressure, each said body carrying a tubular member adapted to receive and to have fixed therein an end of one of the optical conductors to be connected, each said tubular member comprising a barrel portion having at its end a central bore adapted to receive therein an optical conductor fixed in such a manner that the end of the optical conductor is located in the same plane as the end of said barrel portion, a coupling member arranged to receive the ends of said tubular members and having located therein a transparent elastomeric pad having a refractive index close to or substantially the same as that of the optical conductors to be connected and into engagement with which said tubular members can be brought under the action of said complimentary fixing means, said coupling member and/or said elastomeric pad being so shaped as to define between them a space traversed by a portion of said pad and into which said pad can deform under the axial contact pressure exerted thereon by said tubular members, said coupling member comprising a sleeve so located in one of said bodies that said pad is constantly in contact with the barrel portion of said tubular member carried by the same body, and said barrel portion of said other tubular member being capable of penetrating the sleeve by sliding into the latter, and said pad being a full one-piece pad having a generally cylindrical shape in its rest position and passing through said sleeve into said space into which it may deform whereby the axial contact pressure exerted on said pad by said tubular members is insufficiently significant to introduce into said pad constraints giving rise to deterioration in the transmission of light.

2. A connector as claimed in claim 1, for use in multi-mode transmission, with optional extraction of modes between an emitting optical conductor and a receiving optical conductor in which said coupling member is located in said body carrying the tubular member in which said receiving optical conductor is to be fixed; said pad comprises a core surrounded by a sheath, has a cylindrical portion so held in a central bore of said coupling member that it can be retained in contact with the said tubular member which is to contain the receiving optical conductor and that it is located adjacent a supplementary optical receiver, and has a portion with a helical peripheral groove, and located within said space; and the arrangement is such that with said pad located between said tubular members under axial contact pressure light can be conducted between emitting and receiving optical conductors held in the respective tubular members, whereas upon application of a greater axial contact pressure, for said extraction of modes, said grooved portion of the pad undergoes deformation such that the core of said pad adopts a sinusoidal configuration causing deflection of light to said supplementary optical receiver.

3. A connector as claimed in claim 1, in which the said pad is held by its ends in a central bore of said coupling member, said coupling member having an annular internal groove traversed by the central portion of said pad and forming said space into which said pad can deform.

4. A connector as claimed in claim 1, in which said sleeve is crimped at one end onto the barrel portion of the tubular member carried by that body within which said sleeve is located, said pad comprises two cylindrical end portions slidingly mounted in said sleeve and joined to a central portion of smaller diameter by way of two frusto-conical sections, and said pad is retained within said sleeve by an annular abutment projecting towards the interior of said sleeve between the end portions of said pad.

5. A connector as claimed in claim 1, in which said sleeve is crimped at one end onto the barrel portion of the tubular member carried by that body within which said sleeve is located, said pad comprises two adjacent cylindrical portions of different diameter of which the one of smaller diameter is slidingly mounted in the central bore of the sleeve and the one of larger diameter is in contact with said barrel portion of that tubular member upon which said sleeve is crimped, and said sleeve comprises a counter-bore forming said space into which said pad can deform and within which said larger diameter portion of said pad is located.

6. A connector as claimed in claim 1, for use in multi-mode transmission, with optional extraction of modes between an emitting optical conductor and a receiving optical conductor in which said coupling member is located in the body carrying the tubular member in which is to be fixed the receiving optical conductor; said pad comprises a core surrounded by a sheath, has a cylindrical portion so held in a central bore of said coupling member that it can be retained in contact with said tubular member which is to contain the receiving optical conductor and that it is located adjacent a supplementary optical receiver, and has a portion with a plurality of peripheral grooves, and located within said space; and the arrangement is such that with said pad located between said tubular members under axial contact pressure light can be conducted between emitting and receiving optical conductors held in the respective tubular members, whereas upon application of a greater axial contact pressure, for said extraction of modes, said grooved portion of the pad undergoes deformation such that the core of said pad adopts a sinusoidal configuration causing deflection of light to said supplementary optical receiver.

7. A connector as claimed in claim 1, in which said full one-piece pad is formed from two symmetrical pieces each having a facing surface and each of which is located in a bore of one of said tubular members in which the corresponding optical conductor is to be fixed, the arrangement being such that when the two tubular members are caused to approach one another under the action of said complimentary fixing means, said facing surfaces of said pad pieces come together within the confines of said space and form said portion of said one-piece pad traversing said space and adhering to one another to form the composite, deformable pad which may deform into said space.

8. A connector as claimed in claim 1, in which the said pad comprises a core of a transparent elastomer having a refractive index close to or substantially the same as that of the optical conductors to be connected, and a surrounding sheath of the same elastomer into which a metallic additive has been introduced before polymerization.

9. A connector as claimed in claim 1, in which said pad comprises a core of a transparent elastomer having a refractive index close to or substantially the same as that of the optical conductors to be connected, and a surrounding sheath of which the refractive index is weaker than that of the core.

10. A connector as claimed in claim 9, in which the refractive index of said sheath is rendered weaker than that of said core by the addition of a solvent before polymerisation of the elastomer.

11. A connector as claimed in claim 9 or 10, in which said core has lenticular extremities which face the optical conductors to be connected in such a manner that the deformation of said pad causes focussing of the light into an angle of divergence numerically weaker than that of said optical conductor, in order to improve transmission.

12. A connector as claimed in claim 1, in which said pad comprises a core of transparent elastomer of refractive index close to or substantially the same as that of the optical conductors to be connected, surrounded by concentric layers of which the refractive index reduces at each layer in a direction away from the core.

* * * * *